US010708759B1

(12) United States Patent
Roy et al.

(10) Patent No.: US 10,708,759 B1
(45) Date of Patent: Jul. 7, 2020

(54) M2M SM-SR TO SM-DP NOTIFICATION

(71) Applicant: T-Mobile USA, Inc., Bellevue, WA (US)

(72) Inventors: Tanmay Roy, Redmond, WA (US); Cristian Asandului, Snoqualmie, WA (US); Kyeong Hun An, Sammamish, WA (US); Phani Ramisetty, Sammamish, WA (US); Mathew George, Krikland, WA (US); Ryan King, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/417,370

(22) Filed: May 20, 2019

(51) Int. Cl.

| | |
|---|---|
| ***H04W 8/18*** | (2009.01) |
| ***H04W 4/70*** | (2018.01) |
| ***H04W 4/14*** | (2009.01) |
| ***H04L 29/08*** | (2006.01) |
| ***H04B 1/3816*** | (2015.01) |

(52) U.S. Cl.
CPC .......... *H04W 8/183* (2013.01); *H04B 1/3816* (2013.01); *H04L 67/02* (2013.01); *H04L 67/20* (2013.01); *H04W 4/14* (2013.01); *H04W 4/70* (2018.02)

(58) Field of Classification Search
CPC combination set(s) only.
See application file for complete search history.

(56) References Cited

U.S. PATENT DOCUMENTS

| | | | | |
|---|---|---|---|---|
| 10,334,428 | B1 * | 6/2019 | Chen | H04W 4/14 |
| 2016/0286380 | A1 * | 9/2016 | Long | H04W 76/10 |
| 2019/0020997 | A1 * | 1/2019 | Park | H04W 12/08 |
| 2019/0053040 | A1 * | 2/2019 | Long | H04W 8/183 |
| 2019/0104401 | A1 * | 4/2019 | Park | H04L 29/08 |

* cited by examiner

*Primary Examiner* — Junpeng Chen
(74) *Attorney, Agent, or Firm* — Han Santos, PLLC

(57) ABSTRACT

A request from a mobile operator network (MNO) is received at a Subscription Manager Secure Routing (SM-SR) associated with the MNO. The request is for deleting an embedded Subscriber Identity Module (eSIM) profile from an embedded Universal Integrated Circuit Card (eUICC) of a machine-to-machine (M2M) device. The eSIM profile is provided by a Subscription Manager Data Preparation (SM-DP) of a third-party partner of the MNO. A command is sent from the SM-SR to an application on the M2M device to delete the eSIM profile from the eUICC of the M2M device. An indication is then received from the application by the SM-SR indicating that the eSIM profile has been deleted. Accordingly, the SM-SR associated with the MNO may send a notification to the SM-DP of the third-party partner indicating that the eSIM profile has been deleted from the eUICC of the M2M device.

20 Claims, 6 Drawing Sheets

M2M SM-SR TO SM-DP NOTIFICATION

BACKGROUND

The use of embedded universal integrated circuit cards (eUICCs), also referred to as embedded subscriber identity modules (eSIMs), is becoming increasingly prevalent in consumer and machine-to-machine (M2M) communication fields. Unlike a traditional UICC or SIM card that exists as a removable smart card that is transferable between multiple devices, an eUICC is an integrated circuit that is not designed to be user removable, i.e., it is generally embedded with or soldered to other electronic components of a device.

An eUICC may contain one or more eSIM profiles, in which each eSIM profile contains a unique international mobile subscriber identity (IMSI) number that enables a corresponding device to obtain telecommunication services from an associated mobile network operator (MNO). Other data that are stored in the eSIM profile may include carrier network information, security authentication information, a list of accessible network services, and/or so forth. The MNO may transfer an eSIM profile to the eUICC via an over-the-air (OTA) update. M2M devices are networked machines that use the telecommunication services provided by the wireless carrier to communicate with other machines. For example, an M2M monitoring device that is embedded in a vehicle may automatically send vehicle tracking and operation information to a remote support device at a control center. In another example, an M2M device in the form of a smart home appliance may automatically send diagnostic information to a monitoring device at a service center in case of an appliance malfunction. Accordingly, an M2M device that is equipped with an eUICC may be remotely set up to receive telecommunication services from an MNO without having to be provisioned with a physical SIM card from the MNO.

Additionally, once an eSIM profile is installed on an eUICC of an M2M device, the MNO may perform remote operations with respect to the eSIM profile. The remote operations may include remotely activating the eSIM profile so that the M2M device can authenticate to and obtain telecommunication services from the MNO. The remote operations may further include remotely disabling the eSIM profile to terminate the access of the M2M device to the telecommunication services, or remotely deleting the eSIM profile from the eUICC of the M2M device. In some instances, such provisioning operations may be performed by a Subscription Manager Secure Routing (SM-SR) that is operated by the MNO. The SM-SR may be a subscription management service that is hosted on a server of the MNO. The SM-SR may be triggered by a Subscription Manager Data Preparation (SM-DP) to perform the download of the eSIM profiles to M2M devices. The SM-DP is a subscription management service that is responsible for storing eSIM profiles that are available for distribution to eUICCs and managing the profile states of such eSIM profiles. The SM-DP may be hosted on a server of the MNO or a server of a third-party partner of the MNO.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
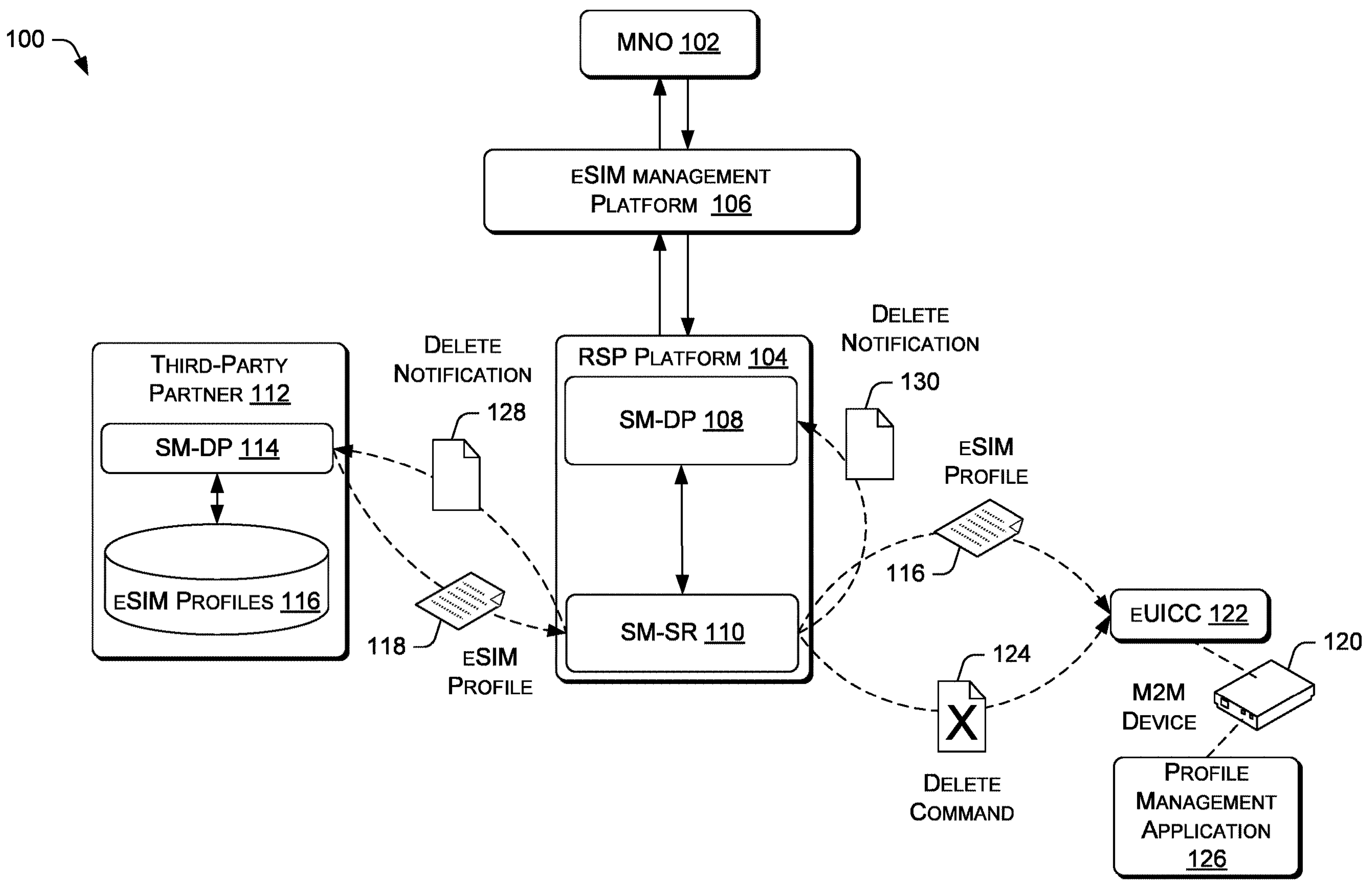
FIG. 1 illustrates an example architecture that enables a Subscription Manager Secure Routing (SM-SR) to send a notification to a Subscription Manager Data Preparation (SM-DP) regarding an eSIM profile deletion initiated by the SM-SR.

This disclosure is directed to techniques that enable a Subscription Manager Secure Routing (SM-SR) operated by remote SIM provisioning (RSP) platform for a mobile network operator (MNO) to send a delete notification to a Subscription Manager Data Preparation (SM-DP), in which the delete notification is sent when a MNO-initiated deletion of an eSIM profile from an eUICC of an M2M device is completed. In some embodiments, the SM-DP may be a subscription management service that is operated by a third-party partner of the MNO rather than the RSP platform, and the eSIM profile is an M2M device profile that is stored and managed by the SM-DP of the third-party partner. For example, the third-party partner of the MNO may be an M2M device vendor, an M2M device operator, an M2M service provider, and/or so forth. In such embodiments, the third-party partner and the MNO may have a service agreement that allows the third-party partner to use the SM-SR of the RSP platform to perform remote operations with respect to the eSIM profile.

Accordingly, the third-party partner may have initially requested that the MNO use the SM-SR of the RSP platform to download a particular eSIM profile managed by the SM-DP of the third-party partner into the eUICC of the M2M device. However, the MNO has the ability to delete the particular eSIM profile from the eUICC of the M2M device without the prior consent of the third-party partner. For example, the MNO may act on its own volition to delete the particular eSIM profile when the service agreement between the MNO and the third-party partner is terminated. The deletion of the eSIM profile is initiated by an operation support system (OSS) or business support systems (BSS) of the MNO via an ES4.DeleteProfile application programming interface (API) call to the SM-SR of the RSP platform per GSMA specifications.

In such embodiments, the SM-SR of the RSP platform may use a notification mechanism to notify the SM-DP of the third-party partner of the deletion once the deletion of the eSIM profile is complete. The notification mechanism may transmit the notification via the HyperText Transfer Protocol (HTTP) protocol or the short message service (SMS) protocol. In turn, the SM-DP of the third-party partner may transition a profile state of the eSIM profile from being in use to available for download. In this way, the SM-DP may have an opportunity to provide the eSIM profile for reuse with another M2M device.

In contrast, conventional implementations of the SM-SR and the SM-DP does not make use of such a notification mechanism. As a result, the deletion of an eSIM profile that is initiated by the MNO via a direct ES4.DeleteProfile API call to the SM-SR of the RSP platform may result in the SM-DP of the third-party partner storing an incorrect profile state for the eSIM profile. For example, the profile state tracked by the SM-DP of the third-party partner may indicate that the profile state of the eSIM profile is in use when the eSIM profile is in fact deleted. Such an incorrect profile state may cause a backend service of the third-party partner to initiate the performance of erroneous remote operations with respect to the eSIM profile. Further, the existence of an incorrect profile state may also make it impossible for the SM-DP of the third-party partner to initiate a reuse of the eSIM profile.

In other embodiments, both the SM-SR and the SM-DP may be subscription management services that are operated by the same RSP platform for the MNO. In such embodiments, the use of the notification mechanism enables the SM-SR of the RSP platform to directly notify the SM-DP of the RSP platform once the deletion of an eSIM profile as initiated by the MNO via an ES4.DeleteProfile API call to the SM-SR is completed. In contrast, the SM-DP currently has to resort to using indirect methods, such as periodic eSIM profile state audits and/or profile state queries to M2M devices, to learn about such an eSIM profile deletion by the MNO. Such efforts on the part of the SM-DP may waste time and computing resources. The techniques described herein may be implemented in a number of ways. Example implementations are provided below with reference to the following FIGS. 1-6.

Example Architecture

FIG. 1 illustrates an example architecture 100 for an SM-SR to send a notification to an SM-DP regarding an eSIM profile deletion initiated by the SM-SR. The MNO 102 may provide a wide range of mobile communication services, as well as ancillary services and features, to subscribers and associated mobile device users. The MNO 102 may also be referred to as a mobile network operator (MNO). In various embodiments, the MNO 102 may provide wireless communication between multiple user devices. Further, the MNO 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The MNO 102 may be implemented using multiple interconnected networks. In various embodiments, the MNO 102 may include multiple Radio Access Networks (RANs). The RANs may be connected to each other via regional ground networks. In turn, the regional ground networks may be connected to a core network by a wide area network (WAN). Each regional portion of the MNO 102 may include one or more RANs and a regional circuit and/or packet switched network and associated signaling network facilities. The MNO 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the MNO 102 may be accessed via wired or wireless local area networks (LANs). For example, a wireless local area network may be a network that is established using Wi-Fi or Bluetooth standards and hardware.

A RAN of the MNO 102 may include a number of base stations, also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and a core network of the MNO 102. The core network may connect to a public packet data communication network, such as the Internet. Data and voice communications via the RANs, the core network, and the Internet may support a variety of telecommunication services through the MNO 102.

In various embodiments, 2G and/or 3G network components of the MNO 102 may include a serving GPRS support node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) gateway (PGW) that routes data traffic between the GGSN and the Internet. The LTE components of the MNO 102 may include an Evolved Packet Core (EPC) and an IP Multimedia Subsystem (IMS) core.

The MNO 102 may provide telecommunication services to multiple user devices, which may include consumer devices and M2M devices. Consumer devices are network-capable devices that are generally marketed to individual consumers, which are capable of obtaining telecommunication and/or data communication services from the MNO 102. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, i.e., an integrated circuit chip that is directly wired or soldered to a circuit board of the user device. The eUICC may store one or more eSIM profiles. Each eSIM profile may include information for accessing telecommunication services (e.g., voice calling service, data service, etc.) provided by a corresponding MNO, such as the MNO 102. Each user device may be further equipped with a modem that enables the user device to perform telecommunication and data communication with the MNO 102. Accordingly, the modem may encode digital information for transmission in uplink radio signals to the MNO 102, as well as decode digital information that are received from the MNO 102 via downlink radio signals.

The MNO 102 may use one or more RSP platforms, such as the RSP platform 104, to distribute eSIM profiles to user devices. In various embodiments, the RSP platform 104 may include at least one Subscription Manager Data Preparation (SM-DP), such as the SM-DP 108, and at least one Subscription Manager Secure Routing (SM-SR), such as the SM-SR 110. The SM-DP 108 may maintain an eSIM profile store that store eSIM profiles for deployment to M2M devices that receive telecommunication services from the MNO 102.

Each of the eSIM profile in the eSIM profile store may have associated profile state data that tracks the profile state of the eSIM profile. For example, when an eSIM profile is available for downloading to the eUICCs of user devices, the profile state of the eSIM profile may be "available for download". However, when an eSIM profile is provisioned to an eUICC of a user device for use, the SM-DP 108 may change the profile state of the eSIM profile to "in use". In various embodiments, the profile states of the eSIM profiles may be stored as metadata that accompanies the eSIM profiles or as data in a separate profile state database. The SM-SR 110 may be responsible for deploying the eSIM profiles stored in the profile data store to the eUICCs of M2M devices. Thus, the RSP platform 104 may operate the SM-DP 108 and the SM-SR 110 on behalf of the MNO 102. For example, the SM-SR 110 of the RSP platform 104 may send one or more data packets that contain an eSIM profile to the modem of a user device via an over-the-air (OTA) update. The data packets are assembled by the software of the modem into the eSIM profile and sent to the eUICC of the user device for installation in the eUICC.

Third-party partners of the MNO 102 may also operate their own SM-DPs. For example, a third-party partner 112 may operate or otherwise have access to an independent SM-DP 114. The SM-DP 114 is independent in the sense that it is not managed or controlled by the MNO 102 or any RSP platforms, such as the RSP platform 104. The SM-DP 114 may maintain an eSIM profile store 116 that stores eSIM profiles for deployment to M2M devices that receive services from the third-party partner 112. The eSIM profiles as stored in the eSIM profile store 116 may be configured so that M2M devices that received the eSIM profiles may use the telecommunication services provided by the MNO 102 to receive services or data from the third-party partner 112.

In various embodiments, the third-party partner 112 may have an agreement with the RSP platform 104. The agreement may stipulate that the MNO 102 is to deploy the eSIM profiles stored in the eSIM profile store 116 to the M2M devices on behalf of the third-party partner 112. In turn, the third-party partner 112 may pay the MNO 102 a fee to use the MNO 102 to provide telecommunication services to the M2M devices. For example, the SM-DP 114 may initiate the provision of an eSIM profile 118 for an M2M device 120 managed by the third-party partner 112 by sending the eSIM profile 118 to the SM-SR 110 of the RSP platform 104. The eSIM profile 118 may be accompanied by a request that the SM-SR 110 provision the eUICC 122 of the M2M device 120 with the eSIM profile 118. Subsequently, the SM-SR 110 of the RSP platform 104 may distribute the eSIM profile 118 to the M2M device 120 on behalf of the SM-DP 114 of the third-party partner 112.

In some instances, the MNO 102 may independently initiate a deletion of the eSIM profile 118 from the eUICC 122 of the M2M device 120. Such deletion of the eSIM profile 118 may be initiated without advance notice to the third-party partner 112. For example, the agreement between the MNO 102 and the third-party partner 112 may terminate. Following termination, the MNO 102 may decide to stop providing telecommunication services to the M2M device 120 by removing the eSIM profile 118 from the eUICC 122 of the M2M device 120.

Accordingly, the MNO 102 may send a profile deletion request to the RSP platform 104 for the eSIM profile 118 with respect to the eUICC 122 of the M2M device 120. In various embodiments, an operational function, such as an operational function of the MNO 102 (e.g., operation support system (OSS), business support system (BSS), and/or so forth) may send the profile deletion request to an eSIM management platform 106. The eSIM management platform 106 is a backend service of the MNO 102 that serves as a central interface between the MNO 102 and one or more RSP platforms. In turn, the eSIM management platform 106 may make an ES4.Delete Profile API call to a corresponding profile deletion API of the SM-SR 110 regarding the eSIM profile 118 stored in the eUICC 122 of the M2M device 120. In turn, the SM-SR 110 of the RSP platform 104 may send a delete command 124 to a profile management application 126 on the M2M device 120 to delete the eSIM profile 118 from the eUICC 122 of the M2M device 120. Subsequently, the SM-SR 110 may receive an acknowledgment from the profile management application 126 indicating that the eSIM profile 118 has been successfully deleted from the eUICC 122 of the M2M device 120. In various embodiments, the SM-SR 110 may communicate with the Profile management application 126 via a standard communication protocol, such as HTTP.

Following the SM-SR 110 of the RSP platform 104 receiving the acknowledgment from the profile management application 126, the SM-SR 110 may send a delete notification 128 to the SM-DP 114 of the third-party partner 112, in which the delete notification 128 indicates that the eSIM profile 118 has been deleted from the eUICC 122 of the M2M device 120. In various embodiments, the SM-SR 110 may send the delete notification 128 to the SM-DP 114 of the third-party partner 112 via a standard communication protocol, such as HTTP. Alternatively, the SM-SR 110 may send the delete notification 128 to the SM-DP 114 via a messaging service, such as the Short Message Service (SMS). In response to the delete notification 128, the SM-DP 114 of the third-party partner 112 may update the profile state of the eSIM profile 118 to indicate that the eSIM profile 118 is available for reuse, i.e., download into the eUICC of another M2M device. Additionally, or alternatively, the update of the profile state for the eSIM profile 118 may prevent a backend service of the third-party partner 112 from initiating erroneous operations (e.g., profile disablement, profile enablement, etc.) with respect to the eSIM profile 118 under the mistaken belief that the eSIM profile 118 is still loaded in the eUICC 122 of the M2M device 120.

In alternative instances, the M2M device 120 may be a user device that is directly managed by the SM-DP 108 of the RSP platform 104 instead of the SM-DP 114. Accordingly, the SM-DP 108 may be responsible for storing the eSIM profile 118 in a corresponding eSIM profile store for distribution, as well as maintaining the profile state of the eSIM profile 118. In such embodiments, the SM-SR 110 may receive an ES4.Delete Profile API call from the MNO 102 to delete the eSIM profile 118 stored in the eUICC 122 from the eSIM management platform 106. In turn, the SM-SR 110 may initiate the profile management application 126 to perform the deletion. The deletion of the eSIM profile 118 from the eUICC 122 terminates an ability of the M2M device 120 to use telecommunication services provided by the MNO 102. Following an acknowledgment from the profile management application 126 that the eSIM profile 118 has been deleted, the SM-SR 110 may send a delete notification 130 to the SM-DP 108. In response to the delete notification 130, the SM-DP 108 may update the profile state of the eSIM profile 118 to indicate that the eSIM profile 118 is available for reuse, i.e., download into the eUICC of another M2M device.

In such alternative instances, the use of a deletion notification mechanism for eSIM profile deletions from eUICCs of M2M devices that are initiated ES4 deletion API calls may allow the SM-DP 108 to save on computation resources. This is because such notification enables the SM-DP 108 to avoid having to resort to indirect methods, such as periodic eSIM profile state audits and/or profile state queries to M2M devices, to learn about such an eSIM profile deletion.

Example RSP Platform

Figure 2:
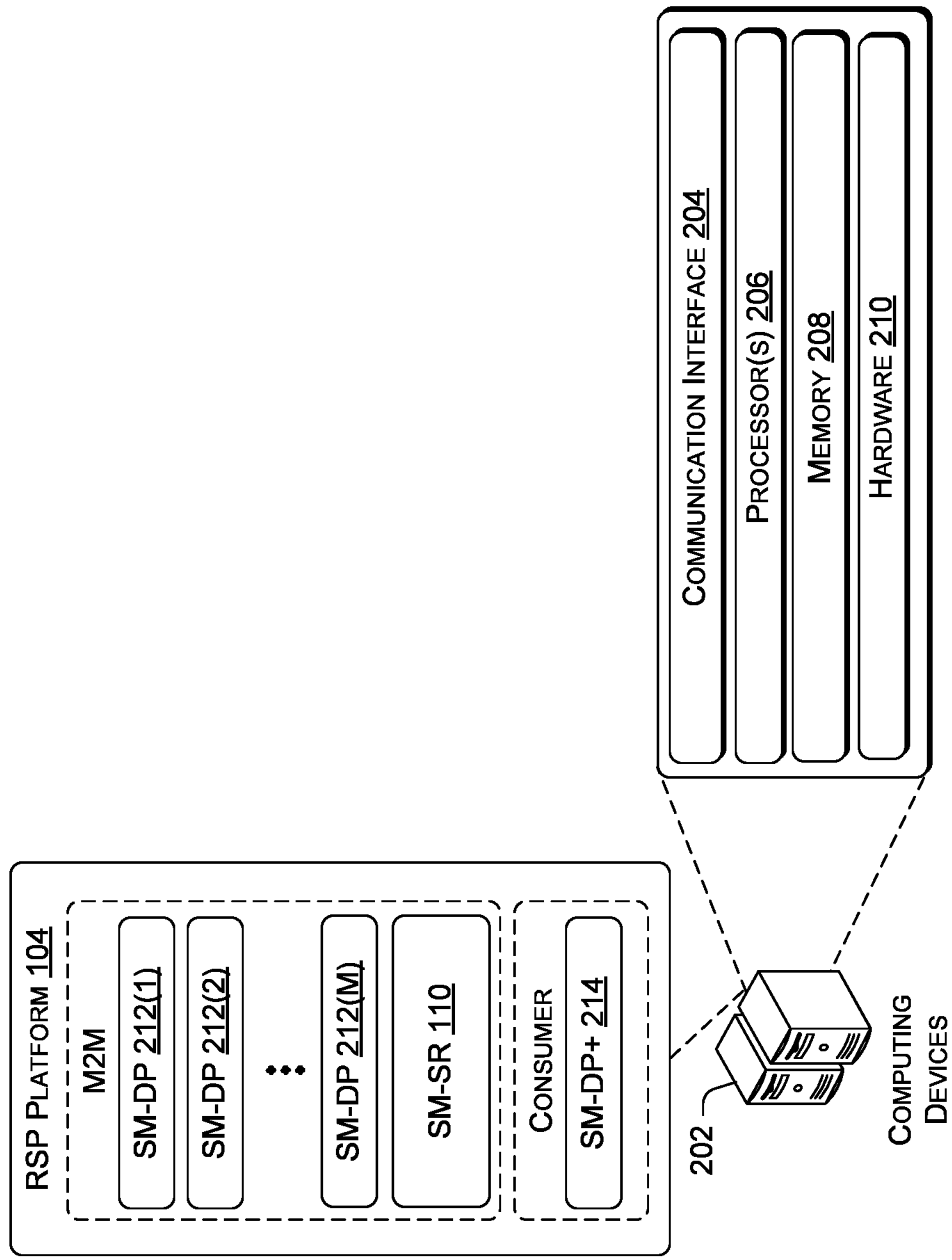
FIG. 2 is a block diagram showing various components of one or more illustrative computing devices that support SM-SR to SM-DP eSIM profile deletion notification.

FIG. 2 is a block diagram showing various components of one or more illustrative computing devices that support SM-SR to SM-DP eSIM profile deletion notification. The RSP platform 104 may be implemented by one or more computing devices 202. The computing devices 202 may include a communication interface 204, one or more processors 206, memory 208, and hardware 210. The communication interface 204 may include wireless and/or wired communication components that enable the computing devices 202 to transmit data to and receive data from other networked devices. The hardware 210 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing devices 202 or components thereof may be virtual computing devices in the form of virtual machines or software containers that are hosted in a computing cloud. The RSP platform 104 may include SM-DPs 212(1)-212(M), the SM-SR 110, and SM-DP+ 214. The SM-DP 108 as described in FIG. 1 is an example of an SM-DP included in the SM-DPs 212(1)-212(M). These software components may be implemented using routines, program instructions, objects, and/or data structures that are executed by the processors 206 to perform particular tasks or implement particular abstract data types.

The eSIM profiles for M2M device, also referred to as M2M eSIM profiles, may be loaded into the profile data stores of SM-DPs 212(1)-212(M). In various instances, the profile data stores of each of the SM-DPs 212(1)-212(M) may hold M2M eSIM profiles that are ordered by a single entity or different entities. For example, a profile data store of the SM-DP 212(1) may hold the M2M eSIM profiles for the MNO 102, while a profile data store of the SM-DP 212(M) may hold the M2M eSIM profiles for a third-party partner of the MNO 102. In another example, a profile data store of the SM-DP 212(1) may hold the M2M eSIM profiles for the MNO 102, but a profile data store belonging to each of the SM-DP 212(2) and 212(M) may hold the M2M eSIM profiles for a respective third-party partner of the MNO 102. However, in other instances, a profile data store of a SIM-DP may be configured to hold M2M eSIM profiles of multiple entities.

Along with the loading of the M2M eSIM profiles into one or more SM-DPs, M2M eUICC ID (EIDs) of eUICCs that are for use by the M2M devices are loaded into a data store of the SM-SR 110. Accordingly, the M2M eSIM profiles may be eventually deployed on these eUICCs. Thus, the SM-DPs 212(1)-212(M) may use the SM-SR 110 distribute eSIM profiles to M2M devices in response to requests from the eSIM management platform 106, as well as perform the functions described in FIG. 1.

On the other hand, the eSIM profiles for consumer devices, also referred to as consumer eSIM profiles, may be loaded into profile state stores of an SM-DP+, such as the SM-DP+ 214. In some instances, each profile data store of the SM-DP+ 214 may hold consumer eSIM profiles of a single entity. In other instance, a single profile data store of the SM-DP+ 214 may hold eSIM profiles of multiple different entities. Further, while the RSP platform 104 is illustrated as having a single SM-DP+ 214, the service may be configured with multiple SM-DP+ s in other embodiments. In such embodiments, each SM-DP+ is responsible for managing the consumer eSIM profiles of a different entity, or the multiple SM-DP+ s can collectively manage consumer eSIM profiles of a single entity. Thus, the SM-DPs 212(1)-212(M) and the SM-DP+ 214 may distribute eSIM profiles to user devices in response to requests from the eSIM management platform 106 of the MNO 102.

Example Processes

FIGS. 3-6 present illustrative processes 300-600 for supporting SM-SR to SM-DP eSIM profile deletion notification. Each of the processes 300-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-600 are described with reference to the architecture 100 of FIG. 1.

Figure 3:
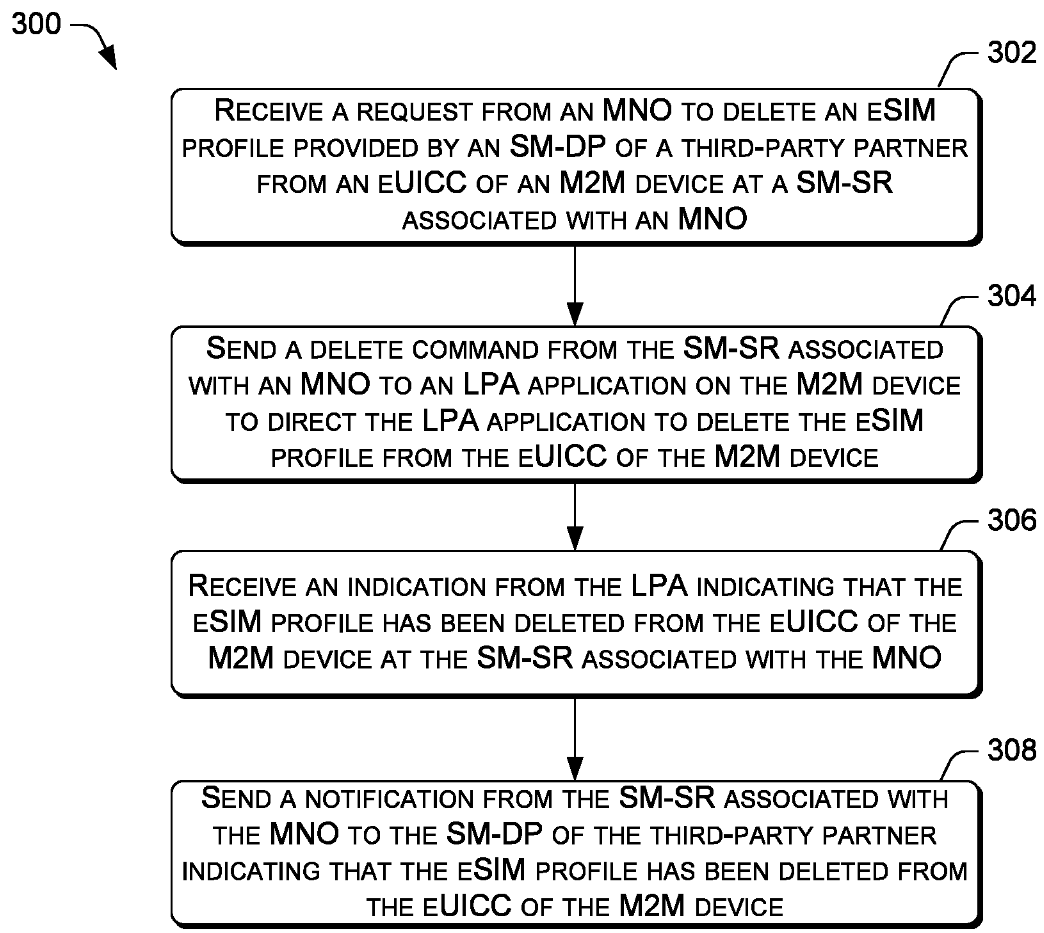
FIG. 3 is a flow diagram of an example process for providing an eSIM profile deletion notification from an SM-SR associated with an MNO to an SM-DP of a third-party partner of the MNO.

FIG. 3 is a flow diagram of an example process 300 for providing an eSIM profile deletion notification from an SM-SR associated with an MNO to an SM-DP of a third-party partner of the MNO. At block 302, the SM-SR 110 associated with the MNO 102 may receive a request to delete an eSIM profile (e.g., eSIM profile 118) provided by the SM-DP 114 of a third-party partner 112 from an eUICC of an M2M device. The SM-SR 110 may be provided by the RSP platform 104 and is responsible for handling eSIM operations with respect to the eSIM profiles that are purchased by the MNO 102 from the RSP platform 104. In other words, the RSP platform 104 may operate the SM-SR 110 on behalf of the MNO 102. The MNO 102 may communicate with the RSP platform 104 via the eSIM management platform 106 of the MNO 102. The eSIM management platform 106 may send the request to the SM-SR 110 via an ES4.DeleteProfile API call to a corresponding API of the SM-SR 110.

At block 304, the SM-SR 110 associated with the MNO 102 may send a delete command from the SM-SR 110 to a profile management application on the M2M device to direct the profile management application to delete the eSIM profile from the eUICC of the M2M device. The deletion of the eSIM profile from the eUICC of the M2M device terminates an ability of the M2M device to use telecommunication services provided by the MNO 102. At block 306, the SM-SR 110 associated with the MNO 102 may receive an indication from the profile management application indicating that the eSIM profile has been deleted from the eUICC of the user. In various embodiments, the SM-SR 110 may communicate with the profile management application via a standard communication protocol, such as HTTP.

At block 308, the SM-SR 110 associated with the MNO 102 may send a notification to the SM-DP 114 of the third-party partner 112 indicating that the eSIM profile has been deleted from the eUICC of the M2M device. In various embodiments, the SM-SR 110 may send the delete notification 128 to the SM-DP 114 via a standard communication protocol, such as HTTP. Alternatively, the SM-SR 110 may send the delete notification 128 to the SM-DP 114 via a messaging service, such as the Short Message Service (SMS).

Figure 4:
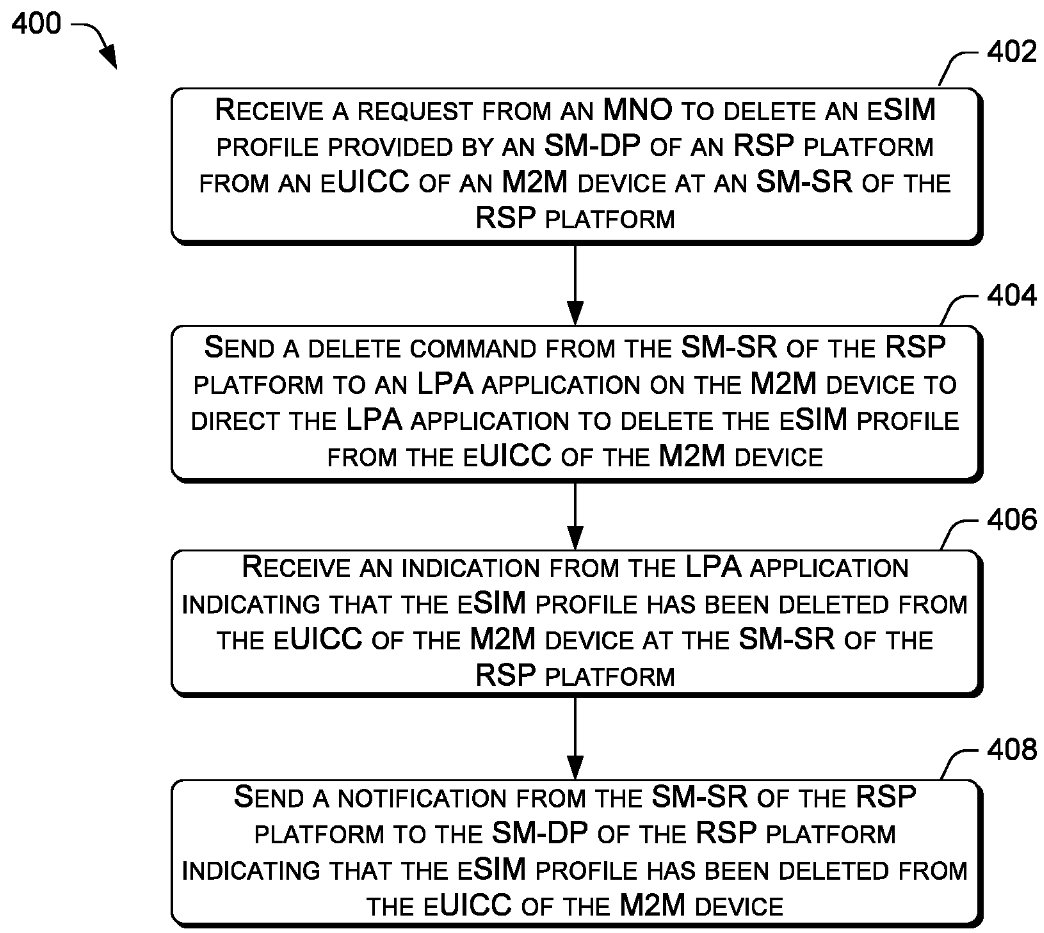
FIG. 4 is a flow diagram of an example process for providing an eSIM profile deletion notification from an SM-SR of an RSP platform that provides services to an MNO to an SM-DP of the RSP platform.

FIG. 4 is a flow diagram of an example process 400 for providing an eSIM profile deletion notification from an SM-SR of an RSP platform that provides services to an MNO to an SM-DP of the RSP platform. At block 402, the SM-SR 110 of the RSP platform 104 may receive a request to delete an eSIM profile (e.g., eSIM profile 118) that is provided by the SM-DP 108 of the RSP platform 104 from an eUICC of an M2M device. The MNO 102 may communicate with the RSP platform 104 via the eSIM management platform 106. The eSIM management platform 106 may send the request to the SM-SR 110 via an ES4.DeleteProfile API call to a corresponding API of the SM-SR 110.

At block 404, the SM-SR 110 associated with the MNO 102 may send a delete command from the SM-SR 110 to a profile management application on the M2M device to direct the profile management application to delete the eSIM profile from the eUICC of the M2M device. The deletion of the eSIM profile from the eUICC of the M2M device terminates an ability of the M2M device to use telecommunication services provided by the MNO 102. At block 406, the SM-SR 110 may receive an indication from the profile management application indicating that the eSIM profile has been deleted from the eUICC of the user. In various embodiments, the SM-SR 110 may communicate with the profile management application via a standard communication protocol, such as HTTP.

At block 408, the SM-SR 110 associated with the MNO 102 may send a notification to the SM-DP 108 of the RSP platform 104 indicating that the eSIM profile has been deleted from the eUICC of the M2M device. In various embodiments, the SM-SR 110 may send the delete notification 130 to the SM-DP 108 via a standard communication protocol, such as HTTP. Alternatively, the SM-SR 110 may send the delete notification 130 to the SM-DP 114 via a messaging service, such as the Short Message Service (SMS).

Figure 5:
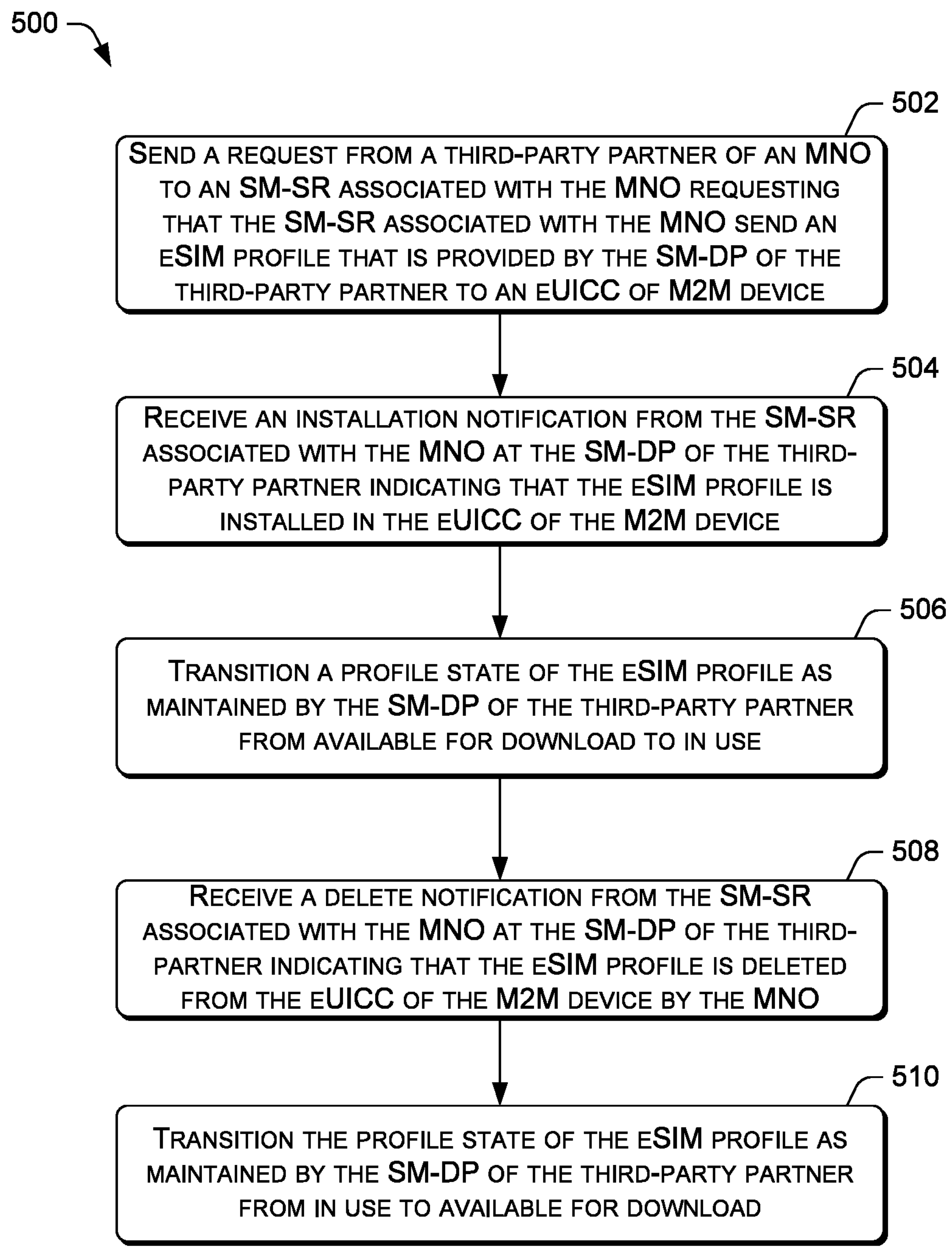
FIG. 5 is a flow diagram of an example process for the SM-DP of a third-party partner of an MNO to reassign an eSIM profile that is deleted from the eUICC of one user device to another user device.

FIG. 5 is a flow diagram of an example process 500 for the SM-DP of a third-party partner of an MNO to reassign an eSIM profile that is deleted from the eUICC of one M2M device to another M2M device. At block 502, the third-party partner 112 may send a request to the SM-SR 110 associated with the MNO 102 requesting that the SM-SR 110 send an eSIM profile that is provided by the SM-DP 114 of the third-party partner 112 to an eUICC of a M2M device. The SM-SR 110 may be provided by the RSP platform 104 and is responsible for handling eSIM operations with respect to the eSIM profiles that are purchased by the MNO 102 from the RSP platform 104. In other words, the RSP platform 104 may operate the SM-SR 110 on behalf of the MNO 102. In various embodiments, the SM-SR 110 may receive the eSIM profile (e.g., eSIM profile 118) from the SM-DP 114 and send the eSIM profile to the eUICC of the M2M device.

At block 504, the SM-DP 114 of the third-party partner 112 may receive an installation notification from the SM-SR 110 associated with the MNO 102 indicating that the operation with respect to the eSIM profile in the eUICC of the M2M device is performed.

At block 506, the SM-DP 114 of the third-party partner 112 may transition a profile state of the eSIM profile as maintained by the SMP-DP 114 from available for download to in use. In various embodiments, the profile state of the eSIM profile may be stored as metadata that accompanies the eSIM profile or as data in a profile state database belonging to the SM-DP 114 of the third-party partner 112.

At block 508, the SM-DP 114 of the third-party partner 112 may receive a delete notification for the SM-SR 110 associated with the MNO 102 indicating that the eSIM profile is deleted from the eUICC of the M2M device by the MNO 102. In various embodiments, the SM-DP 114 may receive the notification following a deletion that is initiated independently by the MNO 102 via an ES4.DeleteProfile API call from the eSIM management platform 106 of the MNO 102 to a corresponding API of the SM-SR 110. The deletion of the eSIM profile terminates the ability of the M2M device to use the telecommunication services provided by the MNO 102.

At block 510, the SM-DP 114 of the third-party partner 112 may transition a profile state of the eSIM profile as maintained by the SM-DP 114 from in use to available for download. In this way, the SM-DP 114 may provide the eSIM profile for reuse in an additional eUICC of an additional M2M device when the third-party partner 112 requests activation of the additional M2M device to use the telecommunication services provided by the MNO 102.

Figure 6:
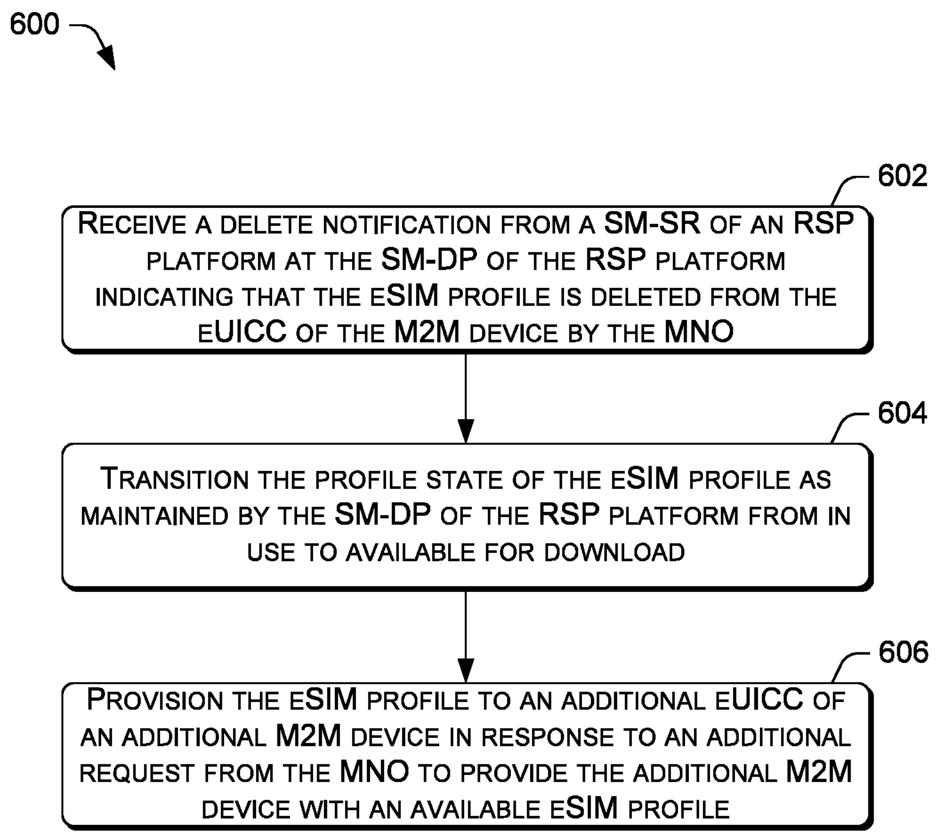
FIG. 6 is a flow diagram of an example process for the SM-DP of an RSP platform that is associated with an MNO to reassign an eSIM profile that is deleted from the eUICC of one user device to another user device.

FIG. 6 is a flow diagram of an example process 600 for the SM-DP of an RSP platform that is associated with an MNO to reassign an eSIM profile that is deleted from the eUICC of one user device to another user device. At block 602, the SM-DP 108 of the RSP platform 104 may receive a delete notification for the SM-SR 110 of the RSP platform 104 indicating that an eSIM profile is deleted from an eUICC of an M2M device by the MNO 102. In various embodiments, the SM-DP 114 may receive the notification following a deletion that is initiated independently by the MNO 102 via an ES4.DeleteProfile API call from the MNO 102 to a corresponding API of the SM-SR 110. The RSP platform 104 may operate the SM-DP 108 and the SM-SR 110 on behalf of the MNO 102. The deletion of the eSIM profile terminates the ability of the M2M device to use the telecommunication services provided by the MNO 102.

At block 606, the SM-DP 114 of the third-party partner 112 may transition a profile state of the eSIM profile as maintained by the SM-DP 114 from in use to available for download. At block 608, the SM-SR 110 may provision the eSIM profile to an additional eUICC of an additional M2M device in response to an additional request from the MNO 102 to provide the additional M2M device with an available eSIM profile. Such reuse of the eSIM profile enables the additional M2M device to receive telecommunication services from the MNO 102.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

receiving a request from a mobile operator network (MNO) to delete an embedded Subscriber Identity Module (eSIM) profile from an embedded Universal Integrated Circuit Card (eUICC) of a machine-to-machine (M2M) device at a Subscription Manager Secure Routing (SM-SR) associated with the MNO, the eSIM profile being provided by a Subscription Manager Data Preparation (SM-DP) of a third-party partner of the MNO;

sending a command from the SM-SR to an application on the M2M device to delete the eSIM profile from the eUICC of the M2M device;

receiving an indication that the eSIM profile has been deleted from the eUICC from the application on the M2M device, in which deletion of the eSIM profile terminates an ability of the M2M device to use telecommunication services provided by the MNO; and sending a notification from the SM-SR associated with the MNO to the SM-DP of the third-party partner indicating that the eSIM profile has been deleted from the eUICC of the M2M device.

2. The one or more non-transitory computer-readable media of claim 1, wherein the request is an ES4.DeleteProfile application program interface (API) call to a corresponding API of the SM-SR associated with the MNO.

3. The one or more non-transitory computer-readable media of claim 1, wherein the request originates from an operation support system (OSS) or business service systems (BSS) of the MNO.

4. The one or more non-transitory computer-readable media of claim 1, wherein the SM-SR is operated by a remote SIM provisioning (RSP) platform on behalf of the MNO, and the request is sent from the MNO to the RSP platform via an eSIM management platform of the MNO.

5. The one or more non-transitory computer-readable media of claim 1, wherein the sending the notification includes sending the notification from the SM-SR of the MNO to the SM-DP of the third-party partner via HTTP or SMS protocol.

6. The one or more non-transitory computer-readable media of claim 1, where the notification prompts the SM-DP of the third-party partner to change a profile state of the eSIM profile from in use to available for download.

7. The one or more non-transitory computer-readable media of claim 1, wherein the third-party partner of the MNO is an M2M device vendor, an M2M device operator, or an M2M service provider.

8. The one or more non-transitory computer-readable media of claim 1, wherein the eSIM profile at least configures the M2M device to use the telecommunication services provided by the MNO to communicate with another computing device.

9. A computer-implemented method, comprising:

receiving, at a Subscription Manager Data Preparation (SM-DP), a delete notification from a Subscription Manager Secure Routing (SM-SR) of a remote SIM provisioning (RSP) platform indicating that an eSIM profile is deleted from an embedded Universal Integrated Circuit Card (eUICC) of a machine-to-machine (M2M) device, in which deletion of the eSIM profile is initiated by mobile operator network (MNO) to terminate an ability of the M2M to use telecommunication services provided by the MNO; and transitioning a profile state of the eSIM profile as maintained by the SM-DP from in use to available for download to an additional eSIM profile of an additional M2M device.

10. The computer-implemented method of claim 9, further comprising sending a request from the SM-DP to the SM-SR of the RSP platform that causes the SM-DP to download the eSIM profile to an additional eUICC of the additional M2M device.

11. The computer-implemented method of claim 9, wherein the eSIM profile is deleted via an ES4.DeleteProfile application program interface (API) call by the MNO to a corresponding API of the SM-SR.

12. The computer-implemented method of claim 9, wherein the SM-SR is operated by the RSP platform on behalf of the MNO, and the SM-DP is operated by a third-party partner of the MNO.

13. The computer-implemented method of claim 12, wherein the eSIM profile is provided by the SM-DP operated by the third-party partner of the MNO, further comprising, prior to the receiving the delete notification:

sending a request from a backend service of the third-party partner to the SM-SR of the RSP platform requesting that the SM-SR send the eSIM profile as provided by the SM-DP operated by the third-party partner of the MNO to the eUICC of the M2M device;

receiving an installation notification from the SM-SR of the RSP platform indicating that the eSIM profile is installed in the eUICC of the M2M device; and transitioning a profile state of the eSIM profile as maintained by the SM-DP operated by the third-party partner of the MNO from available for download to in use.

14. The computer-implemented method of claim 9, wherein the SM-DP and the SM-SR are operated by the RSP platform on behalf of the MNO.

15. A system, comprising:

one or more processors; and memory including a plurality of computer-executable components that are executable by the one or more processors to perform a plurality of actions, the plurality of actions comprising:

receiving a request from a mobile operator network (MNO) to delete an embedded Subscriber Identity Module (eSIM) profile from an embedded Universal Integrated Circuit Card (eUICC) of a machine-to-machine (M2M) device at a Subscription Manager Secure Routing (SM-SR) of a remote SIM provisioning (RSP) platform, the eSIM profile being provided by a Subscription Manager Data Preparation (SM-DP) of the RSP platform;

sending a command from the SM-SR to an application on the M2M device to delete the eSIM profile from the eUICC of the M2M device;

receiving an indication that the eSIM profile has been deleted from the application on the M2M device, in which deletion of the eSIM profile terminates an ability of the M2M device to use telecommunication services provided by the MNO; and sending a notification from the SM-SR of the RSP platform to the SM-DP of the RSP platform indicating that the eSIM profile has been deleted from the eUICC of the M2M device.

16. The system of claim 15, wherein the request is an ES4.DeleteProfile application program interface (API) call to a corresponding API of the SM-SR.

17. The system of claim 15, wherein the request originates from an operation support system (OSS) or business service systems (BSS) of the MNO.

18. The system of claim 15, where the notification prompts the SM-DP of the RSP platform to change a profile state of the eSIM profile from in use to available for download.

19. The system of claim 15, wherein the request is sent from the MNO to the RSP platform via an eSIM management platform operated by the MNO.

20. The system of claim 15, wherein the eSIM profile at least configures the M2M device to use the telecommunication services provided by the MNO.

* * * * *